United States Patent [19]

Dreissigacker et al.

[11] 3,838,302

[45] Sept. 24, 1974

[54] ROTARY RECTIFIER ARRANGEMENT FOR THE EXCITATION OF SYNCHRONOUS MACHINES

[75] Inventors: Erich Dreissigacker; Kurt Jager, both of Mannheim, Germany

[73] Assignee: BBC Brown Boveri & Company Limited, Baden, Switzerland

[22] Filed: Dec. 8, 1972

[21] Appl. No.: 313,412

[30] Foreign Application Priority Data
Dec. 10, 1971  Germany............... 2161577

[52] U.S. Cl. ............................. 310/68 D
[51] Int. Cl. ............................. H02k 11/00
[58] Field of Search ............... 310/68 D, 68 R

[56] References Cited
UNITED STATES PATENTS

| | | | |
|---|---|---|---|
| 3,590,291 | 6/1971 | Spisak.................... | 310/68 D |
| 3,686,523 | 8/1972 | Gordon et al............ | 310/68 X |
| 3,723,794 | 3/1973 | Spisak et al............. | 310/68 D |

FOREIGN PATENTS OR APPLICATIONS

| 1,473,610 | 2/1967 | France................... | 310/68 D |
|---|---|---|---|

Primary Examiner—J. D. Miller
Assistant Examiner—Robert J. Hickey
Attorney, Agent, or Firm—Pierce, Scheffler & Parker

[57] ABSTRACT

A rotary rectifier arrangement for excitation of the inductor of a synchronous electrical machine in which the a.c. output from the armature of an exciter coupled to the shaft of the synchronous machine is rectified and fed to the rotary inductor component of the machine. The rectifiers are supported so as to rotate with the exciter armature by means of a composite collar structure including an integrally formed hub and radially extending part mounted on the exciter shaft and a pair of cylindrical carrier rings extending axially in opposite directions from the radial part of the collar structure and which are shrunk onto the radial part, the rectifiers being made up into separate assemblies which are distributed around, and secured to the under side of, the carrier rings.

10 Claims, 4 Drawing Figures

ROTARY RECTIFIER ARRANGEMENT FOR THE EXCITATION OF SYNCHRONOUS MACHINES

The present invention relates to a rotary rectifier arrangement for excitation of a synchronous machine wherein an alternating current exciter machine whose armature is coupled to the shaft of the synchronous machine generates an alternating current which is then converted to direct current by an arrangement of diode type rectifiers which are likewise mounted for rotation with the exciter machine. The rectified current is then delivered to the rotary inductor component of the synchronous machine. All newer models of synchronous machines which are designed to deliver a large amount of power are structured in this manner in order to avoid the use of slip-rings and brushes which can lead to trouble in feeding the necessary excitation current to the inductor component from an external source.

In the case of one known structural arrangement, as described in the publication Brown Boveri Mitteilungen 1967, pages 539 to 553, the diode rectifiers are secured to the inside of the supporting collar structures mounted on the machine shaft and which are usually made from forged or cast steel parts. The collars present usually an L-shaped profile and suffer from the disadvantages that the portions thereof which extend in the radial direction are placed under centrifugally induced stress by the outer axially extending rim portions thereof as well as by the components of the rectifier assemblies which are carried by them. Moreover, in the known structural designs, the cross-section of the collar structure is weakened by numerous bores therein which serve to accommodate the rectifier components as well as for guiding air currents which are caused to flow over the components in order to cool them.

The principal object of the present invention is to provide an improved structural arrangement for excitation of highpower synchronous machines of the general type described whereby the collar structure applied to the machine shaft and utilized to support the rectifier components is made much stronger and avoids creation of the high order centrifugal stresses in the radially extending portion thereof which have characterized previous designs. Instead of an integral collar structure having an L-shaped profile for supporting the rectifier components, the present invention provides a composite rectifier supporting collar structure consisting of a hub part mounted on the exciter shaft, a radially extending part integral with the hub and two carrier rings which are shrunk onto this radial part. The carrier rings which extend axially in opposite directions from the radial part have a cylindrical configuration and rectifier assemblies including rectifier units together with their circuit associated switching elements and fuses are arranged in circumferentially spaced relation at the under side of the carrier rings and secured thereto.

In one embodiment of the invention the circumferentially spaced rectifier component assemblies include a base plate one end of which is secured in place at the underside of the carrier ring by means of a fastening member having a bevelled surface which engages a like bevelled surface of the base plate end, the fastening member being secured to the radially extending part of the collar structure at a point just beneath the carrier ring. The opposite end of the base plate is fastened to a steel ring having a rectangular profile which is shrunk into a recess provided at the corresponding end of the carrier ring.

In another embodiment of the invention, the underside of each carrier ring is provided with a dove-tail portion which then presents two bevelled faces for receiving two clamps positioned at opposite ends of each rectifier component assembly. These clamps when tightened by a clamping bolt extending between them serve to draw the rectifier component assembly into engagement with the under side of the carrier ring.

By utilizing a composite collar structure in accordance with the invention, the hub and the part which extends radially therefrom constitute one integral structure in which the stress induced therein by centrifugal forces created upon rotation is determined solely by its own weight and the distribution thereof from the axis of rotation. In a like manner, the centrifugally induced stress to which each shrunk-on carrier ring is subjected will depend upon its own inherent weight and the centrifugal force effect created by the weight of each rectifier component assembly secured to it. Consequently it is possible to use for the hub and its radially extending part a material having a lower strength than that which is utilized for the carrier rings.

The invention also provides an enhanced cooling effect for the rectifier assemblies by means of air flow passageways leading from each side of the radially extending part of the composite collar structure beneath the carrier rings to a radial discharge point located between the ends of the carrier rings, cooling air being induced to flow over the rectifier component assemblies and through these passageways as the entire assembly rotates. The cooling effect may be further enhanced by shrinking a centrifugal fan wheel onto the periphery of the collar structure between the inner ends of the carrier rings so as to increase the draft on the cooling air drawn through the passageways provided in the radially extending part.

In general, the composite collar structure provided by the invention does not suffer from any weakening in profile, neither by the passageways provided for the cooling air, nor by the fastening means for the rectifier component assemblies at the collar so that these parts can be made lighter weight-wise. Furthermore, there is no need to provide, as in the case of previously known arrangements, a large number of structure weakening bores in the collar structure for fastening on of the various rectifier components, thus resulting in a significant reduction in the cost of manufacture.

The foregoing as well as other objects and advantages inherent in the invention will become more apparent from the following detailed description of preferred embodiments thereof and from the accompanying drawings wherein.

Figure 2:
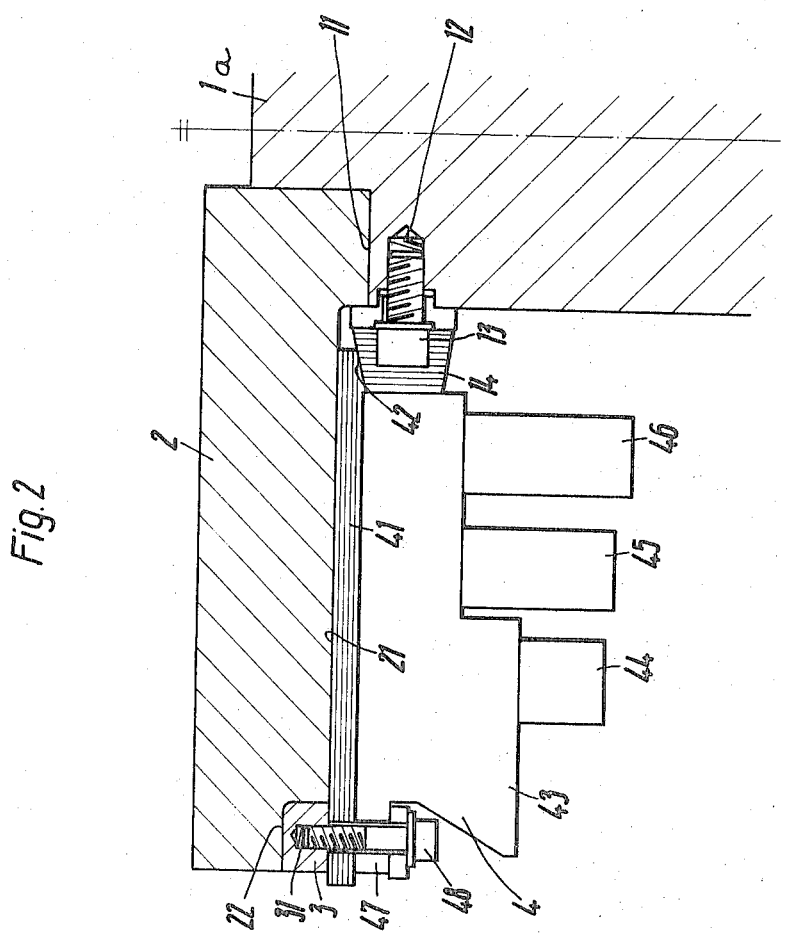
FIG. 2 is a sectional view of one part of the entire support structure for the rectifier assembly as shown in FIG. 1 but drawn to a larger scale in order to illustrate more details.
Figure 3:
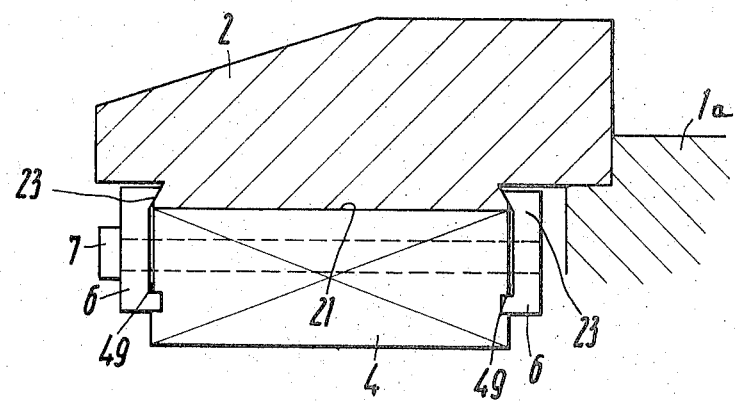
Figure 4:
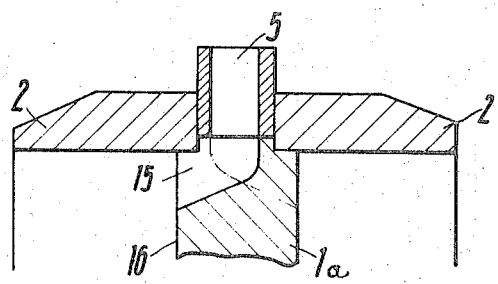

FIG. 3 is a sectional view similar to FIG. 2 but illustrating a modified embodiment for the improved rectifier support assembly; and FIG. 4 is also a sectional view illustrating a further detail applicable to both embodiments directed to inclusion of a bladed centrifugal fan in the structure for increasing the flow of cooling air passing in heat transfer relation with the rectifier assembly as the latter rotates.

Figure 1:
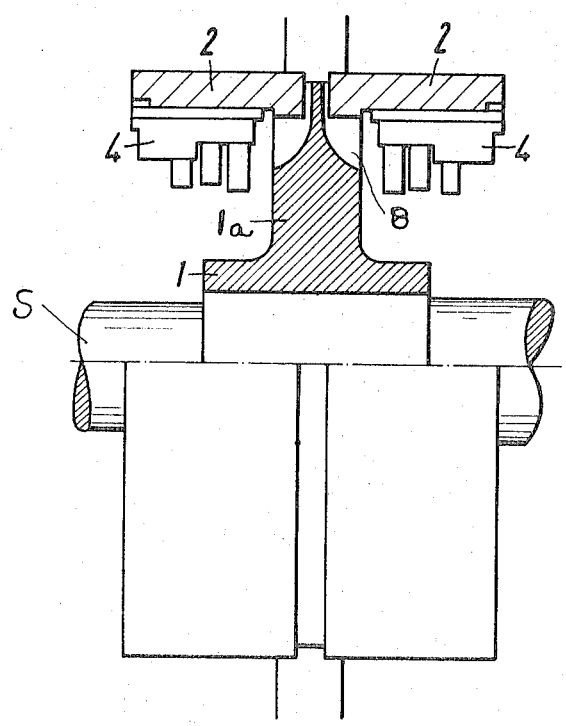
FIG. 1 is a view of one embodiment of the improved composite collar supporting arrangement for the rectifiers and related operating components, the lower half of the view being in elevation and the upper half being mostly in section.

With reference now to FIG. 1, the exciter shaft indicated by S has attached to it a composite collar type of support including a hub 1 provided with an axially extending through-bore enabling the collar to be secured to the exciter shaft, and a radially extending part 1a integral with the hub and which is designed in such manner as to indirectly support a cylindrical array of circumferentially spaced rectifier component assemblies 4 at each side thereof. For this purpose the radially extending part 1a of the composite collar is provided with a portion 11 of reduced diameter at each side thereof onto which cylindrically configured metallic carrier rings 2, made, for example, from forged material, are shrunk.

Each rectifier component assembly 4, one of which is shown in detail in FIG. 2, includes an arcuate base plate 41 made of electrically insulating material which lies in contact with the under side of the carrier ring 2 which extends axially from the collar part 1a, a ribbed body 43 having a good heat-transfer characteristic for heat removal secured to the base plate, and a rectifier 44, switching components 45 and fuse 46, the components 44, 45 and 46 being mounted on the cooling body 43. In order to secure each rectifier component assembly 4 to the under side of the axially extending carrier ring 2, it will be seen from FIG. 2 that the end of the base plate 41 adjacent the collar structure 1a is bevelled at 42 and is engaged by the complementary bevelled head of a fastening member 14 made from electrically insulating material and which is secured against the face of the collar part 1a by a screw 13, which threads into a bore 12 in the collar part 1a. The opposite end of each base plate 41 is secured in place by means of a screw 48 which passes through a bore 47 provided in the base plate and threads into a bore 31 provided in a steel ring 3 having a rectangular profile which is shrunk onto the carrier ring 2 in a circular recess 22 provided in the latter. Shrinking of the ring 3 onto the carrier ring 2 can be accomplished in a "reverse" manner by lowering its temperature to a level substantially below ambient prior to insertion in the recess, or it can be accomplished immediately after the carrier rings 2 are shrunk onto the collar part 1a, i.e., at a time when the dimensions of the carrier ring 1a are still enlarged in comparison with the dimensions at ambient temperature.

The improved supporting arrangement for the rectifier components avoid the necessity of bores or millings in the collar structure of such character that could lead to notching of highly stressed structural parts which could possibly lead to failure.

In order to induce a flow of cooling air over the cooling bodies 43 of the rectifier component assemblies 4, passageways 8 are provided at both sides of the collar part 1a in the vicinity of the assemblies 4 as shown in FIG. 1 through which air is drawn as the exciter shaft S and collar rotate and exhausted in a radially outward direction from the latter between the carrier rings 2.

The second embodiment, as illustrated in FIG. 3 has the same basic structural arrangement as the embodiment shown in FIGS. 1 and 2 in that the oppositely extending carrier rings 2 have one end portion thereof shrunk onto a reduced diameter portion 11 of the collar part 1a but each of the circumferentially spaced rectifier component assemblies 4 is secured against the under side 21 of the carrier ring 2 by a clamping arrangement which includes clamping members 6 placed against opposite ends of the rectifier component assembly 4. One end of each clamp 6 engages a recess 49 provided in the assembly 4 and the other end of the clamp is bevelled so as to lie against the corresponding bevel face 23 of a dove-tailed portion of the carrier ring 2. A screw bolt 7 extends between the clamps 6 through a bore in the rectifier assembly 4 and when tightened serves to draw the clamps 6 in the direction of each other so that their bevelled ends bear against the dovetail faces 23 and simultaneously cause the rectifier assemblies 4 to bear against the under side 21 of the carrier ring 2.

In the embodiment illustrated in FIG. 4 an enhanced cooling effect for the rectifier assemblies 4 is established by shrinking onto the rim of the collar part 1a between the two oppositely extending carrier rings 2 a centrifugal fan wheel 5 which serves to draw air through it in a radially outward direction through passages 15 provided in the outer end of the collar part 1a which lead from the opposite sides 16 of the collar part 1a to the inlet side of the blading on the fan wheel.

We claim:

1. In an arrangement for excitation of a synchronous electrical machine by means of an alternating current exciter wherein the armature of the exciter is coupled to the shaft of the synchronous machine and the alternating current output from the exciter is then converted to direct current by a rotary rectifier arrangement and fed to the rotary inductor component of the synchronous machine, the improvement wherein said rotary rectifier arrangement comprises a composite supporting collar structure including a hub part mounted on the exciter shaft, a radial part extending from said hub part and a pair of cylindrical shrink-fitted carrier rings extending axially in opposite directions from and which bear against corresponding axially extending portions of said radial part, a circular array of circumferentially spaced rectifier component assemblies located at the under side of each of said carrier rings, each said rectifier component assembly including a base plate one end of which is secured in place at the under side of said carrier ring by a fastening member having a bevelled surface engaging a like bevelled surface at one end of said base plate, said fastening member being secured to said radial part of the collar structure at a point beneath said carrier ring, and the opposite end of said base plate being fastened to a steel ring shrunk into a circumferentially extending recess provided in the corresponding end of said carrier ring.

2. An excitation arrangement for a synchronous electrical machine as defined in claim 1 and wherein said radial part of said composite supporting collar structure is provided with air passage-ways leading from each side thereof beneath said carrier rings to a radial discharge point located between the adjacent ends of said carrier rings for inducing a flow of cooling air in heat-transfer relation with said rectifier component assemblies.

3. An excitation arrangement for a synchronous electrical machine as defined in claim 2 and which further includes a centrifugal fan wheel shrunk onto the periphery of said collar structure between the adjacent ends of said carrier ring to increase the draft on the cooling air drawn through said passageways.

4. An excitation arrangement for a synchronous electrical machine as defined in claim 1 wherein the hub and radial parts of said composite supporting collar structure are made from a material having a lesser strength than the material from which said carrier rings are made.

5. In an arrangement for excitation of a synchronous electrical machine by means of an alternating current exciter wherein the armature of the exciter is coupled to the shaft of the synchronous machine and the alternating current output from the exciter is then converted to direct current by a rotary rectifier arrangement and fed to the rotary inductor component of the synchronous machine, the improvement wherein said rotary rectifier arrangement comprises a composite supporting collar structure including a hub part mounted on the exciter shaft, a radial part extending from said hub part and a pair of cylindrical shrinkfitted carrier rings extending axially in opposite directions from and which bear against corresponding axially extending portions of said radial part, a circular array of circumferentially spaced rectifier component assemblies located at the under side of each of said carrier rings, each said carrier ring being provided at its under side with a dove-tail part, and said rectifier component assemblies being secured in place to said dove-tail part by means of clamps including bevelled surfaces which clamp against the opposite sides of said dove-tail part and other surfaces which clamp against the opposite ends of said rectifier component assemblies, and clamping bolts extending between said clamps.

6. An excitation arrangement for a synchronous electrical machine as defined in claim 5 and wherein said radial part of said composite supporting collar structure is provided with air passage-ways leading from each side thereof beneath said carrier rings to a radial discharge point located between the adjacent ends of said carrier rings for inducing a flow of cooling air in heat-transfer relation with said rectifier component assemblies.

7. An excitation arrangement for a synchronous electrical machine as defined in claim 6 and which further includes a centrifugal fan wheel shrunk onto the periphery of said collar structure between the adjacent ends of said carrier ring to increase the draft on the cooling air drawn through said passageways.

8. An excitation arrangement for a synchronous electrical machine as defined in claim 5 wherein the hub and radial parts of said composite supporting collar structure are made from a material having a lesser strength than the material from which said carrier rings are made.

9. In an arrangement for excitation of a synchronous electrical machine by means of an alternating current exciter wherein the armature of the exciter is coupled to the shaft of the synchronous machine and the alternating current output from the exciter is then converted to direct current by a rotary rectifier arrangement and fed to the rotary inductor component of the synchronous machine, the improvement wherein said rotary rectifier arrangement comprises a composite supporting collar structure including a hub part mounted on the exciter shaft, a radial part extending from said hub part and a pair of cylindrical shrink-fitted carrier rings extending axially in opposite directions from and which bear against corresponding axially extending portions of said radial part, and a circular array of circumferentially spaced rectifier component assemblies secured to the under side of each of said carrier rings, said radial part of said composite supporting collar structure being provided with air passage-ways leading from each side thereof beneath said carrier rings to a radial discharge point located between the adjacent ends of said carrier rings for inducing a flow of cooling air in heat-transfer relation with said rectifier component assemblies.

10. An excitation arrangement for a synchronous electrical machine as defined in claim 9 and which further includes a centrifugal fan wheel shrunk onto the periphery of said collar structure between the adjacent ends of said carrier ring to increase the draft of the cooling air drawn through said passageways.

* * * * *